Nov. 8, 1938.   H. R. EVANS ET AL   2,135,805
CAN STACKING MACHINE
Filed Dec. 20, 1935   4 Sheets-Sheet 4
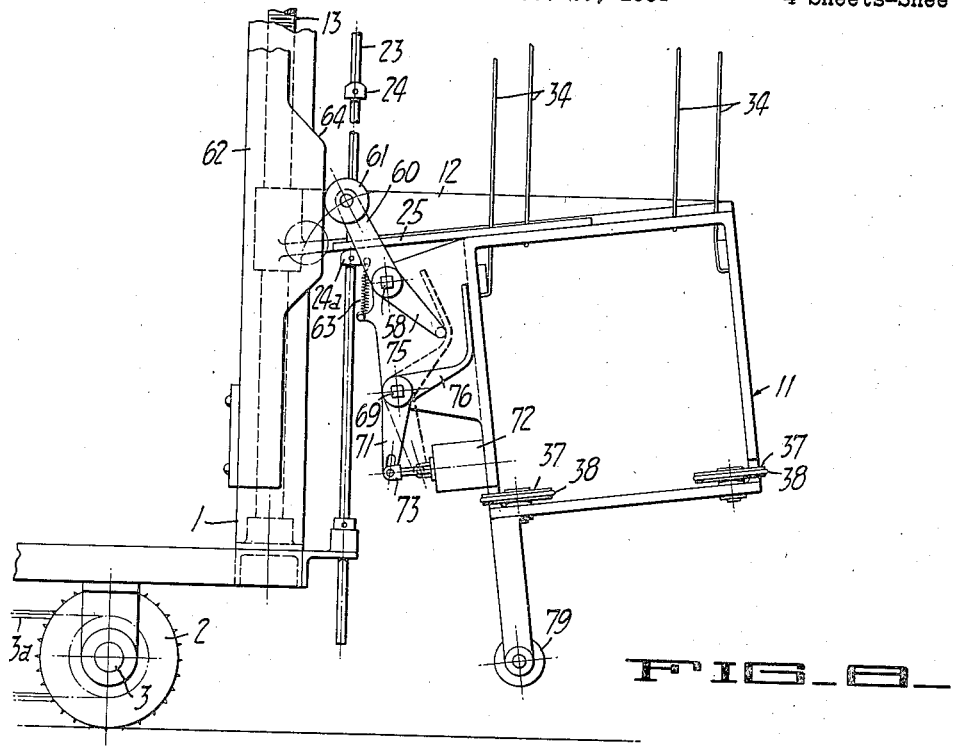
FIG_8_
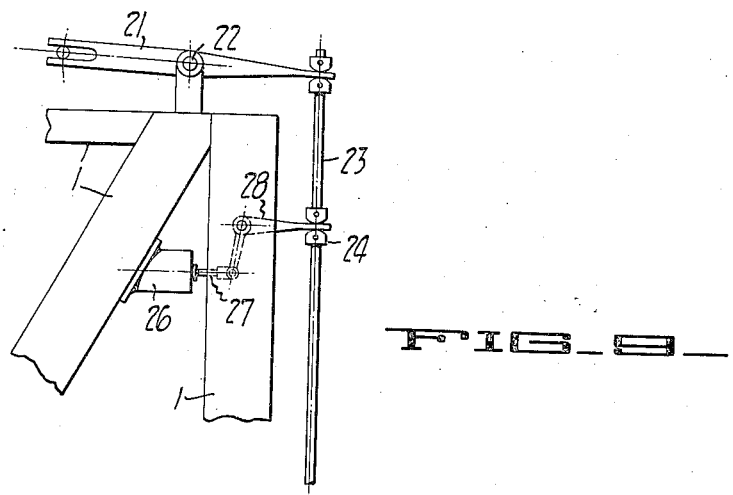
FIG_9_
INVENTORS
HOWARD R. EVANS
WALTER C. HULSMAN
BY
ATTORNEY.

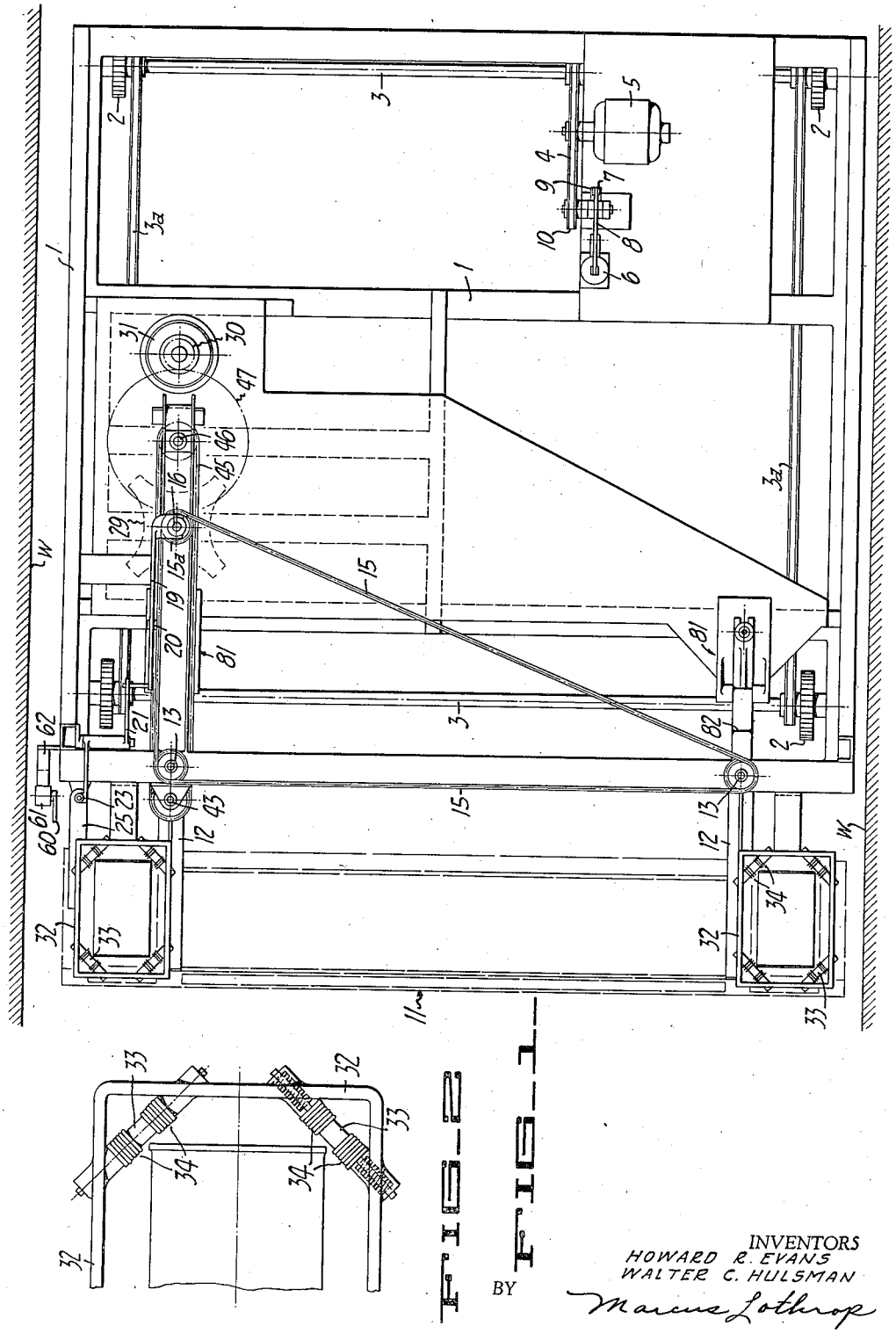

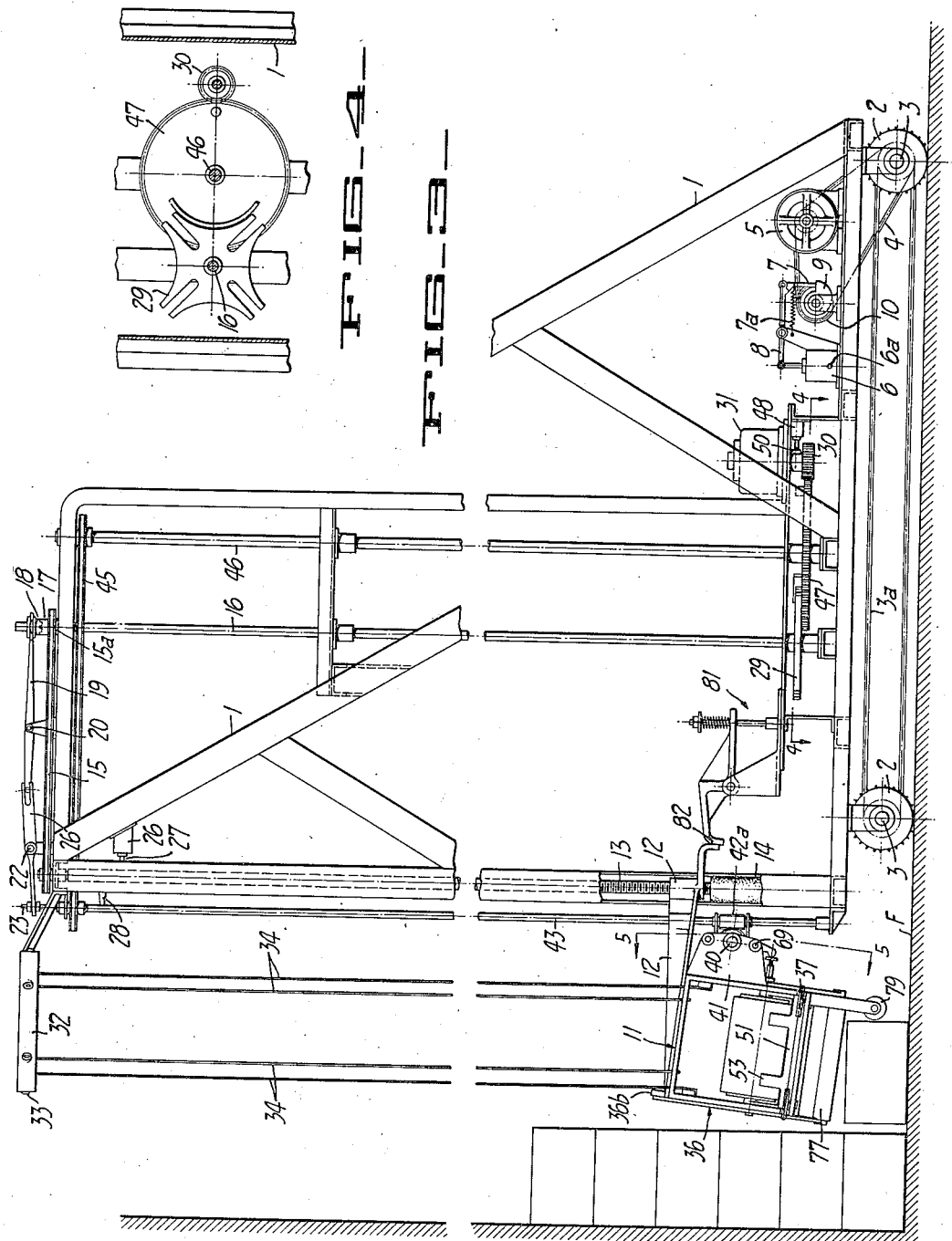

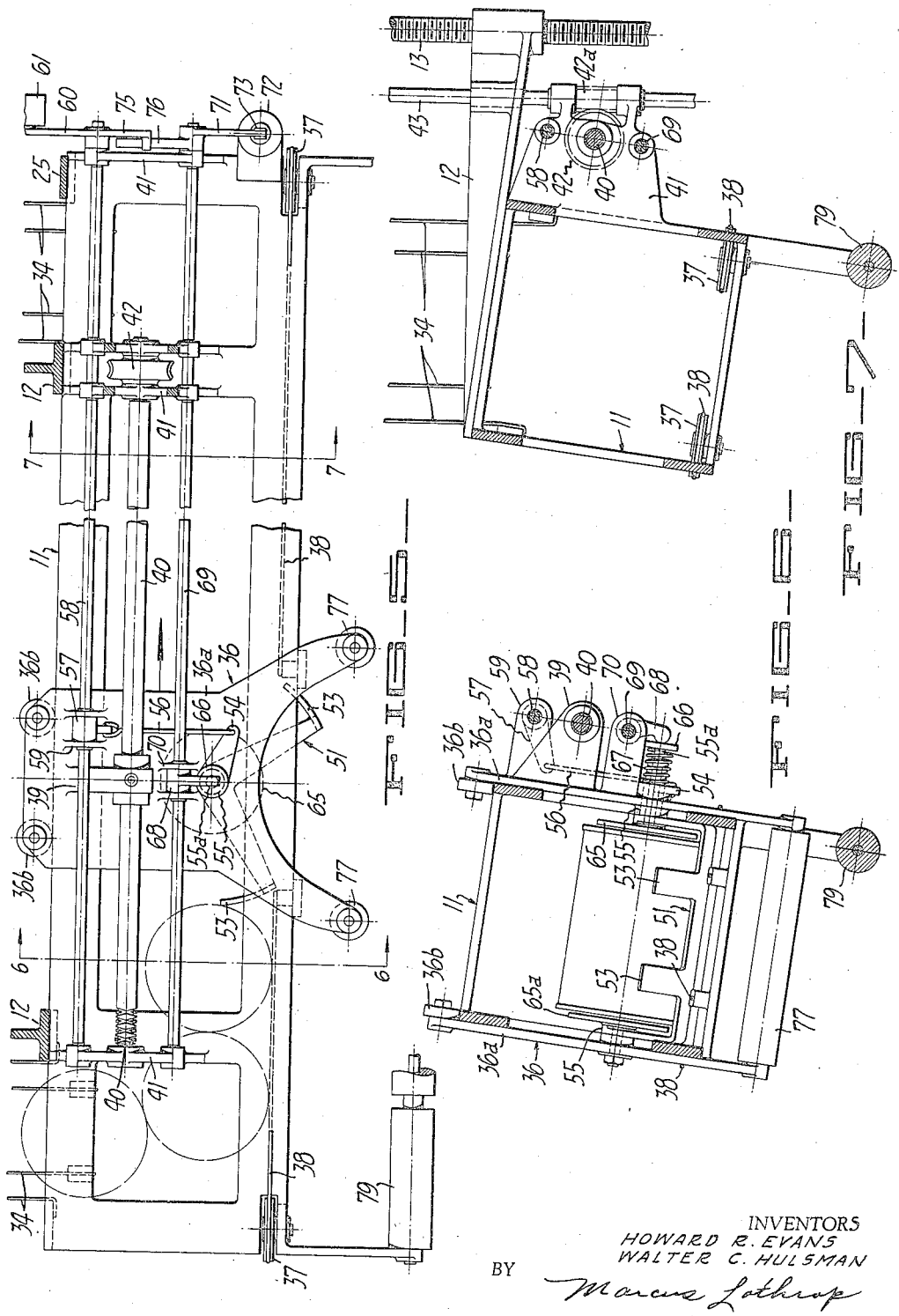

Patented Nov. 8, 1938

2,135,805

UNITED STATES PATENT OFFICE 2,135,805

CAN STACKING MACHINE

Howard R. Evans and Walter C. Hulsman, San Jose, Calif.

Application December 20, 1935, Serial No. 55,446

13 Claims. (Cl. 214—6)

The present invention relates particularly to a machine for stacking cans or items of similar conformation in parallel rows in superimposed layers and between confining walls.

It is an object of the invention to provide a device of the character indicated that may be operated in confined quarters.

It is another object to provide a device of the character indicated that will automatically lay one horizontal row of cans on top of another in vertical sequence and automatically repeat the operation.

A further object is to provide a machine which, after laying several horizontal rows of cans in vertical sequence, will advance horizontally and lay an adjacent series of horizontal rows of cans in vertical sequence.

It is still another object to provide a machine of the character indicated that will properly deposit the cans, smooth out buckles, and bring several vertical stacks into juxtaposition.

It is an additional object of the invention to provide a machine for stacking cans or similar articles that will be economical to manufacture, simple in form and construction, that will function easily, smoothly and positively, and that will be strong, durable and highly efficient in its practical application.

The foregoing and other objects are attained in the embodiment of the invention illustrated in the drawings, in which, Fig. 1 is a plan of a can stacking machine in accordance with our invention.

Fig. 2 is a fragmentary portion of the can chute to an enlarged scale.

Fig. 3 is a side elevation of our can stacking machine, the central portion thereof being broken away to reduce the size of the figure.

Fig. 4 is a cross-section showing in plan the Geneva gear drive.

Fig. 5 is a cross-section the planes of which are indicated by the lines 5—5 of Fig. 3.

Fig. 6 is a cross-section the plane of which is indicated by the line 6—6 of Fig. 5.

Fig. 7 is a cross-section the plane of which is indicated by the line 7—7 of Fig. 5.

Fig. 8 is an end elevation of the distributor and adjacent mechanism shown to an enlarged scale.

Fig. 9 is a detail showing to an enlarged scale the actuating mechanism for the electrical switch.

The machine herein disclosed comprises a main framework 1 which is rectangular in plan and elevation and somewhat triangular in side elevation.

The framework is of a size to fit readily into the space wherein the cans are to be stacked and, for example, extends with only slight clearance transversely between the walls W of a freight car with the triangular portion descending toward the center of the car floor F or directed away from the intended depository of the cans. The stacking operation is preferably initiated adjacent one end of the car and the machine is progressively advanced toward the car center as the car is filled, the cans being supplied from outside the car by any suitable means, such as a travelling conveyor (not shown) commonly used in can handling. The cans to be stacked are preferably received in two continuous or substantially continuous streams at the upper part of the framework 1. Each stream is comprised of cans with their axes substantially horizontal and mutually parallel.

Defining a suitable rectangle to receive the cans of one stream at one corner of the machine are vertically extending parallel wires 34, eight in number, at their lower ends fastened to one end of a transversely extending distributor 11 vertically movable on the framework 1. At the other end of the distributor is a comparable group of eight guide wires for receiving and guiding cans of the other stream being supplied at the other corner of the machine. Since the distributor is vertically movable, continuous connection between it and the can-supplying stream is effected by fastening the upper ends of the guide wires to reels 33 mounted on the frames 32 and having spring take-up devices to maintain appropriate position and tension of the guide wires for all vertical positions of the distributor. When the distributor is in its lowermost position, the guide wires are fully extended to provide channels guiding cans into both ends of the distributor.

The distributor 11 itself amounts to an upwardly slanted, rectangular, elongated cage or box, open on the bottom and adapted to receive cans at both ends of the top. The cans are prevented from passing indiscriminately through the open bottom and are caused to arrange themselves in a transverse file within the distributor by a pair of supporting cables 38 each of which is trained around its respective pair of pulleys 37 at opposite ends of the distributor and has its ends fastened to a carriage 36 movable along the distributor transversely of the car. The cables are closely enough spaced that they afford continuous supports for cans which fill the distributor ahead of and behind the carriage in all positions of the carriage.

The carriage is designed to discharge one can at a time from the distributor and to do so for either direction of operation, so that the first horizontal row is laid from left to right, for example, and the row above is then laid from right to left and the process is repeated. The carriage travels on the distributor, receiving cans ahead of it and discharging them below and behind, while other cans fill in immediately behind the carriage for subsequent discharge when the carriage reverses. To provide this action, the carriage includes a cradle 51 having two pairs of upstanding fingers 53 thereon adapted for oscillation about axles 55. Plates 36a having rollers 36b thereon engaging the distributor 11 form part of the carriage and support the axles 55.

With the cradle in one of its two inclined or oscillated positions and located adjacent one end of the distributor, the carriage is propelled along the distributor to lay cans behind it. "Buckles" or cans projecting above the lower row are smoothed out by the effective one of two rollers 77 depending from opposite sides of the cradle to be effective upon cans just in advance of the carriage for either direction of travel. The propulsion of the carriage is afforded by a screw shaft 40 having oppositely pitched helices thereon and rotatably mounted in brackets 41 on the distributor. A bracket 39 on the carriage carries a finger engaging one of the helices on the shaft, so that when the shaft is rotated the carriage is moved from one end of the distributor to the other end thereof and then back again. Rotation is imparted to the shaft 40 by a skew gear 42 thereon meshing with a comparable skew gear 42a having a square hub aperture slidably engaging a square shaft 43 journaled in the framework. A sprocket at the upper end of the shaft 43 is engaged by a chain 45 passing over a similar sprocket on a shaft 46 journaled in the framework and carrying a gear 47. An electric motor 31 drives a pinion 30 meshing with the gear and thus drives the carriage.

When the carriage has about completed one trip transversely of the car and has laid one row of cans, it is lifted an amount about equal to the diameter of a can so that upon the return trip of the carriage a row of cans will be laid on top of the first row. The inclination of the distributor causes the peripheral bead or flange of the upper can to lie ahead of or behind the bead or flange on the lower can and not register exactly therewith. So that the cans will be laid at the proper elevation, the entire distributor is lifted one step for each traverse of the carriage. Passing through suitably threaded nuts 12 fixed on the distributor are screw shafts 13 extending vertically and journaled in the framework 1. The threads on the screw shafts are preferably of steep pitch so that the distributor will descend gravitally and rotate the screw shafts unless a superior force is exerted through them. Each of the screw shafts at its upper end is provided with a sprocket around which a chain 15 is trained, the chain also engaging a sprocket wheel 15a fastened to one member 17 of a dog clutch. The mating member 18 of the dog clutch is mounted to slide on the squared end of a driving shaft 16 which receives motion through a Geneva wheel 29 actuated by a pin on the gear 47. The pin rotates the Geneva wheel and the shaft 16 one-quarter of a revolution at a time, so that when the clutch members 17 and 18 are engaged and the motor 31 is energized, the screw shafts 13 are given a succession of partial rotations. This movement raises the distributor for each traverse of the carriage, so that when the direction of traverse has been changed, the distributor has been raised one step about equal to the diameter of a can.

For each trip of the carriage, the direction of the cradle 51 is changed by rotating the axles 55. This is effected by an arm 54, fast on one of the axles, to which is fastened a link 56 connected to a lever 57 slidably mounted on a square shaft 58 and axially confined by a fork 59 on the carriage. The shaft 58 is suitably journaled on the distributor and at one extremity carries a lever 60 terminating in a cam follower 61. A tension spring 63 urges the follower against cam 64 on a cam bar 62 mounted on the framework, the cam irregularities being such that the shaft 58 is held in one extreme position to hold the cradle in a corresponding extreme position during one traverse of the carriage, and so that the shaft 58 is held in its other extreme position holding the cradle in a corresponding extreme position during the return traverse of the carriage.

The cans are laid in a series of vertically superimposed horizontal rows until the desired height or number of rows has been attained. Thereupon a projection 25 on the distributor comes into abutment with an adjustable stop 24 on a vertically slidable rod 23 mounted in the framework 1, and lifts the rod. Actuated by the lifting motion of the rod is a lever 21 connected by a fulcrum pin 22 to the framework and engaging a similar clutch operating lever 19 mounted on the framework 1 by a fulcrum pin 20. The lever 19 disengages the clutch member 18, and the screw shafts 13 are thus disconnected from the motor 31 so that the distributor is free to and does descend gravitally to its lowermost position. At the same time the lever 28 operates part of the switch 26 to deenergize the motor 31 and to energize a solenoid 48 to apply a brake 50 to the motor.

But in order that the descending distributor will not interfere with the stack of cans just placed, the lift of the rod 23 is effective through another part of electric switch 26 to reverse the connections to and the direction of torque in an electric motor 5. This driving motor 5 is connected by a sprocket chain 4 to one of a pair of spiked driving wheels 2 on an axle 3. A similar axle and pair of driving wheels also support the framework 1 and are connected by chains 3a to the first pair. Hence, when the motor 5 is reversed, the entire framework 1 is advanced in the car in a direction toward the center thereof and away from the tier of cans just stacked. It is during this advancing movement that the distributor falls gravitally until it is retarded by friction brakes 82, adjusted by setting devices 81, and finally comes to rest in its lowermost position against rubber stops 14.

As it assumes its lowermost position, the distributor projection 25 abuts a stop 24a on the rod 23 and returns the rod to lower position. The levers 21 and 19 are actuated by the return of the rod 23 to re-engage the clutch members 18 and 17 and the lever 28 again closes the switch to the motor 31, de-energizes the brake solenoid 48 and reverses the direction of torque of the motor 5. The motor 5 then tends to rotate the wheels 2 in a direction to produce retrograde movement of the framework 1, but this return movement is preferably retarded until at least one row of cans is laid upon the car floor.

For this purpose, the sprocket chain 4 engages a sprocket 10 which rotates a cam 9 of snail form having a radial abutment against which a rod 7 is held by a coil spring 7a. A rocker 8 transmits movement of the rod 7 to a dashpot 6 provided with an adjustment 6a so that retrograde torque of the motor 5 (counterclockwise, as seen in Fig. 3) is resisted in a predetermined amount by the dashpot. The return of the framework is sufficiently slow that the previously energized motor 31 has resumed the cycle of the cradle 51 and distributor, so that at least one horizontal layer of cans has been deposited transversely on the car floor but spaced away from the previously stacked cans by the excessive advancing movement of the framework when the distributor dropped.

But during the laying of the new row of cans, and especially when the row has been completed, the cans are moved axially back along the car floor until they abut the previously laid cans. This provides a compact arrangement despite variations in the axial dimensions of the cans and is preferably effected by a roller 79 suspended from the distributor to contact the laid cans and to press each row of cans while it is being laid tightly against the row of cans axially behind it. This operation continues until the top of the stack is attained, whereupon the rod 23 is again lifted and the distributor is released to lower itself and repeat the cycle.

To prevent the accidental discharge of cans from the cradle during lowering movement of the distributor, a pair of clamp discs 65a and 65 are disposed at the ends of the cradle opposite the ends of a can thereon. The disc 65 is axially movable to clamp a can between it and the disc 65a and thereby to block egress from the cradle. A coil spring 67 encompassing a stem 55a on the disc 65 normally urges the disc 65 out of clamping engagement, but clamping is accomplished by a lever 68 abutting a head 66 on the stem 55a and carried on a transverse square shaft 69 and held between the tines of a fork 70 on the cradle frame 36a. The shaft 69 is rotated by a lever 71 thereon which is connected by a link 73 to the core of a solenoid 72 mounted on the distributor 11. The solenoid is energized by connections in the switch 26 simultaneously with interruption of the circuit to the motor 31, so that as the distributor descends, the clamp disc 65 is effective, release occurring as soon as the switch 26 is again actuated.

An arm 76 on the lever 71 engages a similar arm 75 on the lever 60, so that during descent of the distributor and energization of the solenoid 72, the roller 61 is held away from the cam 64 to prevent needless oscillation of the cradle, although there is no interference with the clamping mechanism by the lever 60 and the arm 75 when the solenoid is deenergized.

It is to be understood, of course, that while we have herein shown and described but one specific embodiment of the invention, changes in form, construction, and method of assembly and operation may be made within the scope of the appended claims.

We claim:

1. A can stacker comprising, in combination, an intermittently movable frame having an upstanding face portion, a horizontally disposed can distributor constrained to move vertically over said face, can supplying means leading to said distributor, reciprocating can depositing means movable lengthwise of the distributor, and means for releasing cans for deposit from said depositing means during both directions of reciprocation thereof.

2. A can stacker comprising, in combination, an intermittently movable frame having an upstanding face portion, a horizontally disposed can distributor constrained to move vertically over said face, a vertically extensible can chute leading to each end of the distributor, reciprocating can depositing means movable lengthwise of the distributor, and means for rendering said can chutes alternately effective in accordance with the direction of reciprocation of said can depositing means.

3. The combination with a can stacker including a main frame and a horizontally disposed distributor vertically movable thereon, of an adjustable can feeding chute for each end of the distributor comprising, frames mounted on the main frame above each end of the distributor, a spring actuated roller angularly mounted in each corner of each frame, and a pair of wires mounted on each roller at one end and connected to the distributor at the other end.

4. A can stacker comprising, in combination, a frame having an upstanding face portion, a horizontally disposed can distributor constrained to move vertically over said face, can supplying means leading to said distributor, a reciprocating carriage associated with the distributor, can depositiong means associated with the carriage, and a can aligning device including a transverse roller parallel to said face portion depending from the distributor.

5. A can stacker comprising, in combination, a frame having an upstanding face portion, a horizontally disposed can distributor constrained to move over one face thereof, can supplying means leading to said distributor, a reciprocating carriage associated with the distributor, can depositing means associated with the carriage, a can aligning device including a transverse roller parallel to said face portion depending from the distributor, and means for actuating the distributor, the carriage and depositing means in coordinate relation to each other.

6. A can stacker comprising, in combination, a frame, a horizontally disposed can distributor constrained to move vertically thereon, elevating and lowering devices connected thereto, can supplying means leading to the distributor, reciprocating can depositing means associated with the distributor to move lengthwise thereof, can locking means associated with the depositing means, means for actuating said locking means at the beginning of the downward movement of said distributor, and means for actuating the elevating devices, depositing means and actuating means in coordinate relation to each other.

7. In a can stacker, a distributor comprising, and elongated frame, a carriage associated with the frame to move lengthwise thereof, cables connected to one side of the carriage within the distributor and passing around one end thereof and thence back and over the other end thereof to the other side of the carriage to form a support for cans in the distributor, reversible can depositing means operatively mounted in the carriage, and means for actuating the carriage and depositing means in coordinate relation to each other.

8. A can stacker comprising a frame, means on said frame for laying from left to right a horizontal row of cans with the can axes parallel, and means on said frame for elevating said laying means into position to lay from right to left a successive horizontal row of cans with the can axes parallel and superimposed upon the first row of cans.

9. A can stacker comprising a frame, means on said frame for laying a row of cans, means for elevating said laying means, and means for alternately supplying opposite ends of said laying means with cans in all elevated positions thereof.

10. A can stacker comprising a frame, means on said frame for laying a row of cans during operation of said laying means in one direction, and means for operating said laying means subsequently to lay a super-imposed row of cans during operation of said laying means in the opposite direction.

11. A can stacker comprising a frame, a carriage mounted to travel vertically and horizontally on said frame, means on said carriage for laying cans, and means for alternately supplying cans to said laying means from opposite ends of said carriage in different vertical positions of said carriage.

12. A can stacker comprising, in combination, a frame having an upstanding face portion, a horizontally disposed can distributor constrained to move vertically over said face, a carriage reciprocable on the distributor, a reversible inclined cradle on the carriage, and means for reversing the inclination of said cradle at the end of the carriage movement in either direction.

13. A can stacker comprising, in combination, a supporting frame having an upstanding face portion, a horizontally disposed can distributor constrained to move vertically over said face, elevating and lowering devices connected thereto, can supplying means leading to the distributor, can depositing means reciprocable lengthwise of the distributor, and means controlled by the depositing means in a predetermined position upon the distributor for actuating the elevating and lowering devices.

HOWARD R. EVANS.
WALTER C. HULSMAN.